United States Patent
Nolz et al.

(10) Patent No.: US 8,469,765 B2
(45) Date of Patent: Jun. 25, 2013

(54) GAME CALL APPARATUS HAVING A SECONDARY AIR PASSAGEWAY

(75) Inventors: Jason Nolz, Manchester, IA (US); Tad Brown, Preston, MO (US)

(73) Assignee: Flambeau, Inc., Baraboo, WI (US)

( * ) Notice: Subject to any disclaimer, the term of this patent is extended or adjusted under 35 U.S.C. 154(b) by 280 days.

(21) Appl. No.: 13/074,216

(22) Filed: Mar. 29, 2011

(65) Prior Publication Data

US 2012/0252311 A1    Oct. 4, 2012

(51) Int. Cl.
*A63H 33/40* (2006.01)
*A63H 33/00* (2006.01)

(52) U.S. Cl.
USPC .......................................... 446/202; 446/207

(58) Field of Classification Search
USPC ............ 446/202–209, 216, 397, 416; 84/330, 84/349, 350, 380 R, 386
See application file for complete search history.

(56) References Cited

U.S. PATENT DOCUMENTS

| | | |
|---|---|---|
| 747,078 A | 12/1903 | Leipold |
| 1,383,878 A | 7/1921 | Taylor |
| 2,396,359 A | 3/1946 | Yager |
| 2,544,370 A | 3/1951 | Walther |
| 2,551,367 A | 5/1951 | Fahey |
| 2,556,388 A | 6/1951 | Bicocchi |
| 3,054,216 A | 9/1962 | Testo |
| 3,066,444 A | 12/1962 | Dieckmann |
| 3,466,794 A | 9/1969 | Pritchard et al. |
| 3,656,258 A | 4/1972 | Thomas |
| 3,802,120 A | 4/1974 | Erhart |
| 3,928,935 A | 12/1975 | Beadles, Jr. |
| 4,138,800 A | 2/1979 | Lege |
| 4,143,485 A | 3/1979 | Stewart |
| 4,737,130 A | 4/1988 | Mann |
| 4,821,670 A | 4/1989 | Foxcroft et al. |
| 4,888,903 A | 12/1989 | Knight et al. |
| 4,915,660 A | 4/1990 | Overholt, Sr. |
| 5,160,815 A | 11/1992 | Prater |
| 5,630,744 A * | 5/1997 | Bandy ........................... 446/202 |
| 5,735,725 A | 4/1998 | Primos |
| 5,885,125 A | 3/1999 | Primos |
| 5,885,126 A | 3/1999 | Carlson |
| 6,120,341 A | 9/2000 | Hafford |
| 6,231,417 B1 | 5/2001 | Palmer |
| 6,234,859 B1 | 5/2001 | Primos et al. |
| 6,234,860 B1 | 5/2001 | Cook |
| 6,386,938 B1 * | 5/2002 | Novak et al. ................... 446/186 |
| 6,413,139 B1 | 7/2002 | Douglas |
| 6,413,140 B1 | 7/2002 | Primos |
| 6,435,933 B1 | 8/2002 | Browne |
| 6,491,564 B1 * | 12/2002 | Miller ........................... 446/202 |
| 6,527,614 B1 | 3/2003 | Primos |
| 6,575,804 B1 | 6/2003 | Primos |
| 6,926,578 B1 | 8/2005 | Casias et al. |
| 7,465,213 B1 * | 12/2008 | Pribbanow ..................... 446/202 |
| 7,918,709 B1 * | 4/2011 | Primos et al. ................. 446/202 |
| 2002/0061703 A1 | 5/2002 | Greenwaldt |

\* cited by examiner

OTHER PUBLICATIONS

Photographs of Haydel's Game Calls, Inc. CW-03 Compensator Wood Duck Call first sold in 2003.

*Primary Examiner* — Kien Nguyen
(74) *Attorney, Agent, or Firm* — Quarles & Brady LLP

(57) ABSTRACT

A game call apparatus for imitating sounds of game upon receiving air exhaled by a user includes a mouthpiece, a reed assembly, and a secondary air member. Air is capable of entering and exiting the game call through the secondary air member, and the game call is capable of producing multiple types of game vocalizations, such as those of male deer.

20 Claims, 5 Drawing Sheets

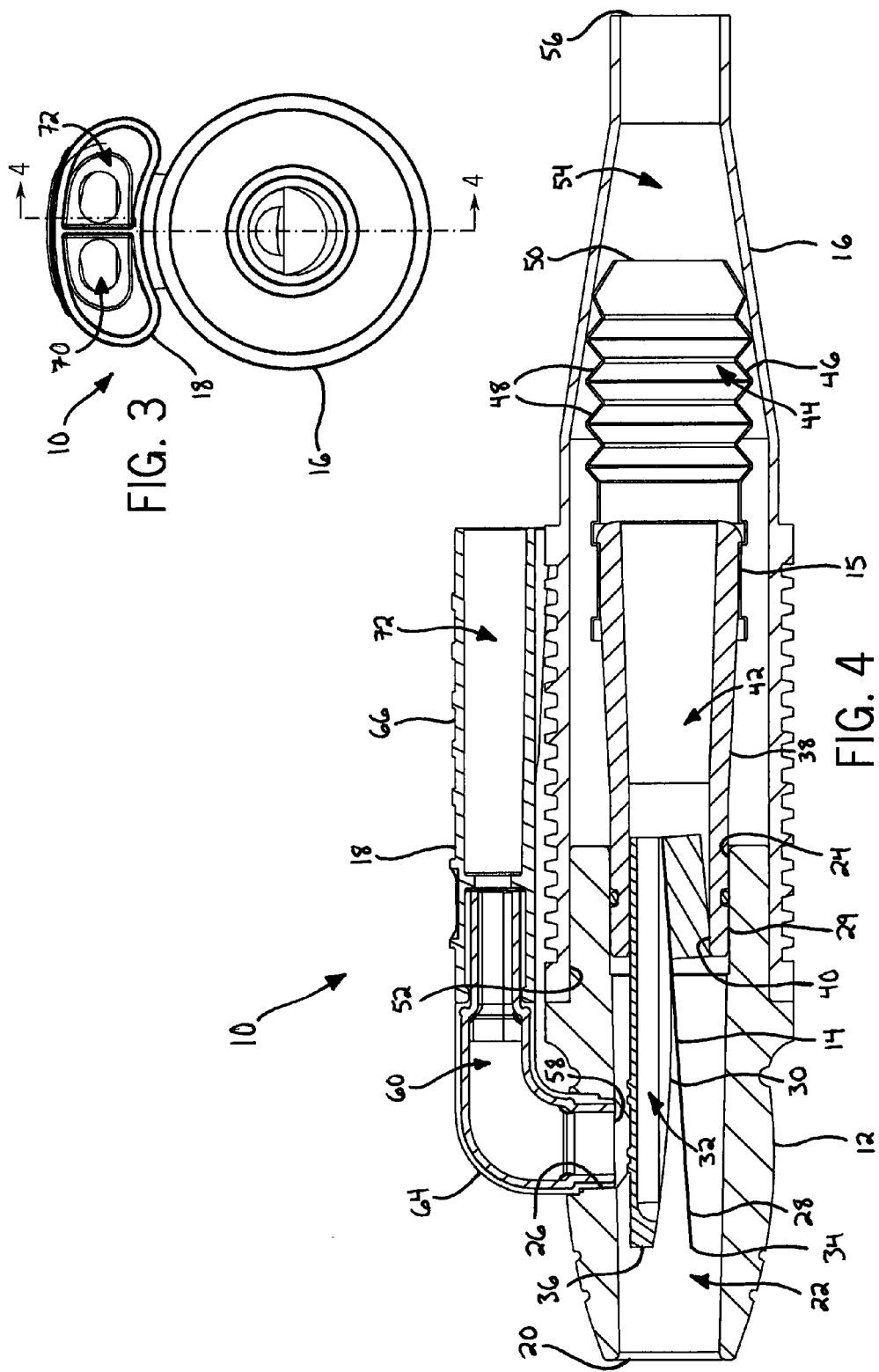

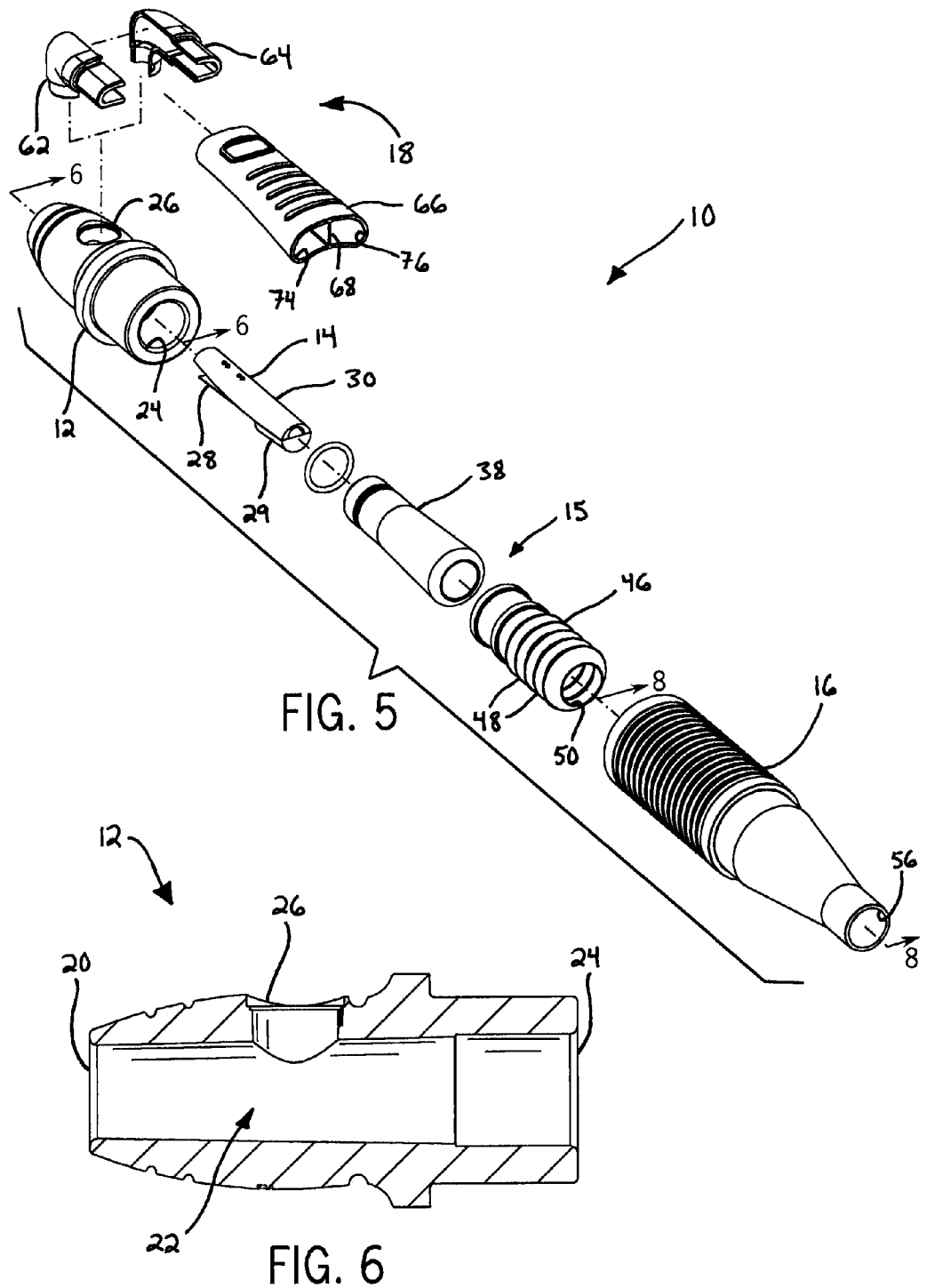

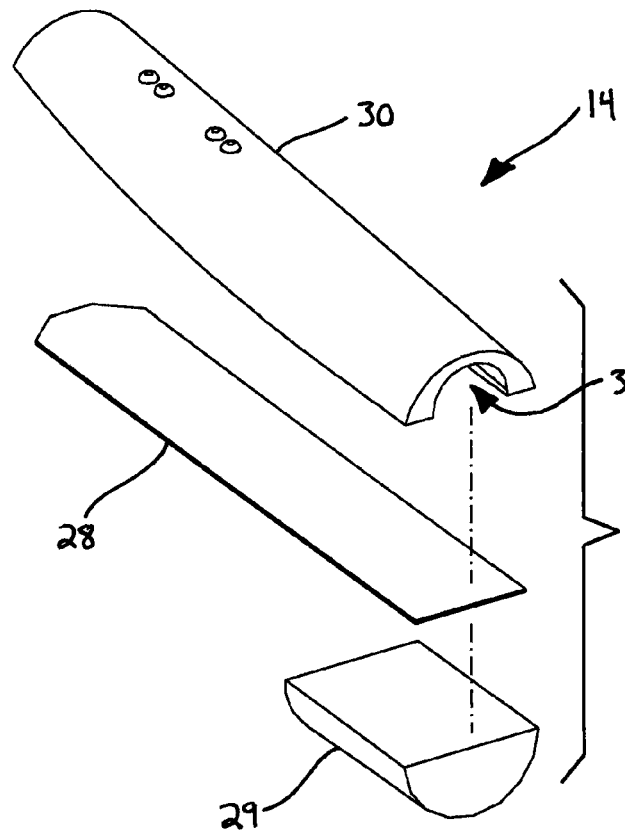
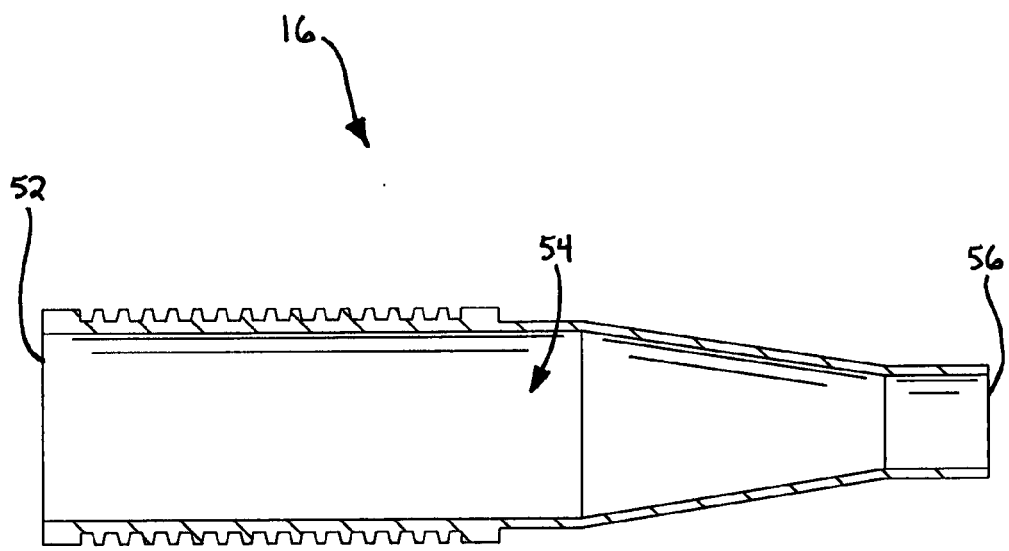

GAME CALL APPARATUS HAVING A SECONDARY AIR PASSAGEWAY

CROSS-REFERENCE TO RELATED APPLICATION

Not applicable

STATEMENT OF FEDERALLY SPONSORED RESEARCH OR DEVELOPMENT

Not applicable.

BACKGROUND OF THE INVENTION

This invention relates to game calls, particularly game calls for imitating multiple types of vocalizations.

Hunters use game calls to imitate vocalizations of game, such as deer, elk, fowl, bear, and the like, in an attempt to attract game and provide a close-range shot. In general, such game calls typically receive air exhaled by a user to thereby imitate the game vocalizations. The specific structures that create these sounds vary depending on the particular type of game the call is intended to imitate. For example, vibrating diaphragm-based calls are typically used to imitate turkey vocalizations, and whistle-based calls are typically used to imitate waterfowl vocalizations. Larger vibrating-reed based calls are typically used to imitate vocalizations of deer and elk.

Due to the widespread use of game calls in recent years, many animals can distinguish sounds created using a game call from vocalizations of another animal. Similarly, a single type of animal, such as deer, does not simply produce a single type of vocalization. Instead, most animals produce different vocalizations that have varying sound qualities. For these reasons, animals have learned to avoid sources of sound that seem artificial or simply repeat a single type of vocalization. As such, many game calls often drive game away from a hunter instead of attracting it because they only superficially imitate a single type of game vocalization.

As such, there is a need for an improved game call apparatus that more closely imitates game vocalizations than previous designs and creates multiple types of game vocalizations.

BRIEF SUMMARY OF THE INVENTION

In one aspect, the present invention provides a game call that is capable of producing multiple types of game vocalizations, such as those of male deer. Similarly, components of the game call replicate, to some extent, a deer's sound passageways (i.e., throat, sinus cavity, nostrils, and mouth) to facilitate improved imitations of game vocalizations.

In another aspect, the invention provides a game call apparatus for imitating sounds of game upon receiving air exhaled by a user. The apparatus comprises a mouthpiece including a wall. The wall defines a game call air inlet configured to receive the air exhaled by the user. A mouthpiece air passageway is in fluid communication with the game call air inlet to receive the air exhaled by the user. A mouthpiece primary air outlet is in fluid communication with the mouthpiece air passageway to receive at least a portion of the air exhaled by the user. The apparatus further comprises a reed assembly that includes a sounding board disposed within the mouthpiece air passageway. The sounding board defines a trough passageway through which the at least a portion of the air exhaled by the user passes. A reed is disposed within the mouthpiece air passageway and is configured to vibrate in response to flow of the air exhaled by the user. The reed has an upstream end proximate the game call air inlet. The apparatus further comprises a secondary air member that includes a wall. The wall defines a secondary opening in fluid communication with the mouthpiece air passageway. An upstream end of the secondary opening proximate the game call air inlet is disposed downstream of the upstream end of the reed. A secondary air member passageway is in fluid communication with the secondary opening, and a secondary air member inlet/outlet is in fluid communication with the secondary air member passageway. Air is capable of entering and exiting the game call through the secondary air member inlet/outlet.

In some embodiments, the game call air inlet and the mouthpiece primary air outlet define a primary direction extending therebetween, and the secondary opening faces a secondary direction generally perpendicular to the primary direction. Furthermore, in other embodiments the apparatus further comprises a primary air member including a wall. The wall defines a primary air member passageway in fluid communication with the mouthpiece primary air outlet to receive the at least a portion of the air exhaled by the user. A game call air outlet is in fluid communication with the primary air member passageway, and the at least a portion of the air exhaled by the user exits the game call through the game call air outlet.

These and other features, aspects, and advantages of the present invention will become better understood from the description that follows. In the description, reference is made to the accompanying drawings, which form a part hereof and in which there is shown by way of illustration, not limitation, an embodiment of the invention. The description of preferred embodiments is not intended to limit the invention to cover all modifications, equivalents, and alternatives. Reference should therefore be made to the claims recited herein for interpreting the scope of the invention.

BRIEF DESCRIPTION OF THE DRAWINGS

Further objects and advantages of the invention will appear when taken in conjunction with the accompanying drawings in which:

FIG. 3 is a front view of the game call apparatus of FIG. 1;

FIG. 4 is a sectional view of the game call apparatus along line 4-4 of FIG. 3;

FIG. 5 is an exploded perspective view of the game call apparatus of FIG. 1;

FIG. 6 is a sectional view of a mouthpiece of the game call apparatus along line 6-6 of FIG. 5;

FIG. 7 is an exploded view of a reed assembly of the game call apparatus of FIG. 1;

FIG. 8 is a sectional view of a primary air member of the game call apparatus along line 8-8 of FIG. 5;

DETAILED DESCRIPTION OF THE INVENTION

Figure 1:
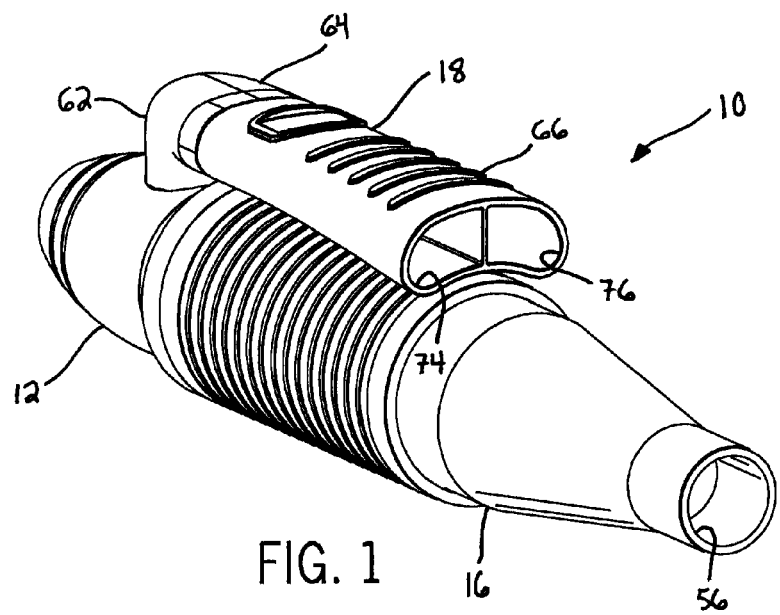
FIG. 1 is a perspective view of a game call apparatus according to the present invention.
Figure 2:
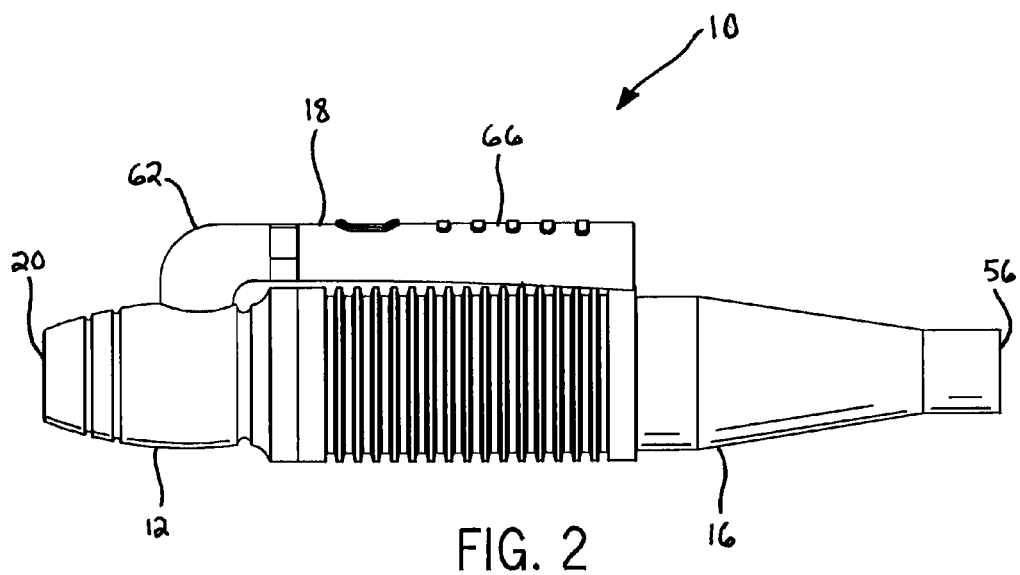
FIG. 2 is a side view of the game call apparatus of FIG. 1.

Referring first to FIGS. 1-5, a game call apparatus 10 according to the present invention generally includes a mouthpiece 12 that receives air exhaled by a game call user. The air travels through the mouthpiece 12 and interacts with an internal reed assembly 14 (FIGS. 4 and 5) to create sounds that imitate game vocalizations. The air and sound waves move into an inner air member 15 (FIGS. 4 and 5) before entering a primary air member 16 and ultimately exiting the game call 10. The game call 10 further includes a secondary air member 18 that maintains air in the mouthpiece 12 at a relatively low pressure, preferably atmospheric pressure. As such, in some situations some of the air passing through the mouthpiece 12 exits the call 10 through the secondary air member 18. In other situations, the secondary air member 18 instead serves as a second inlet to the mouthpiece 12. In any case, the secondary air member 18 facilitates producing multiple types of game vocalizations, such as those of male deer. In a related aspect, the components described above replicate, with regard to their general shape and positioning, a deer's sound passageways (i.e., throat, sinus cavity, nostrils, and mouth) to facilitate improved imitations of game vocalizations. These aspects as well as further details of the above components are described below.

Referring now to FIGS. 4-6, the mouthpiece 12 is a hollow cylinder-like component that includes a wall that defines multiple openings and a passageway for receiving and transmitting air to other components. In particular, the mouthpiece 12 includes a game call air inlet 20 that receives and transmits air to an internal mouthpiece air passageway 22. The mouthpiece air passageway 22 is in fluid communication with a mouthpiece primary air outlet 24 adjacent the primary air member 16 and a mouthpiece secondary opening 26 adjacent the secondary air member 18. The game call air inlet 20 and the primary air outlet 24 both face in a primary air flow direction extending therebetween. In contrast, the auxiliary opening 26 faces in a secondary air flow direction perpendicular to the primary air flow direction. Such a configuration facilitates air flow within the secondary air member 18 as described in further detail below.

In addition to the openings and passageway, the mouthpiece 12 detachably houses the reed assembly 14 within the mouthpiece air passageway 22. As such, air moving within the mouthpiece air passageway 22 interacts with the reed assembly 14 to create imitated game vocalizations. Referring to FIGS. 4, 5, and 7, the reed assembly 14 includes a thin cantilevered reed 28 that vibrates as air passes thereby to create the imitated game vocalizations. The reed assembly 14 also includes a wedge 29 and a sounding board 30 that sandwich and support the reed 28 within the mouthpiece 12. The sounding board 30 defines a trough passageway 32 through which air and sound waves pass toward the mouthpiece primary air outlet 24.

The trough passageway 32 preferably has a relatively small cross-sectional area compared to that of the mouthpiece secondary opening 26. Such a configuration permits air to move into or out of the mouthpiece air passageway 22 through the secondary air member 18 depending on how forcefully the user exhales into the call 10. During normal operation, air passes through the secondary air member 18 and into the mouthpiece air passageway 22. However, if a user exhales forcefully, air passes out of the mouthpiece air passageway 22 and exits through the secondary air member 18. Such an action inhibits a user from "over-blowing" the call 10 or causing the reed 28 to seize (i.e., stop vibrating and creating sound).

The reed 28 and, in some embodiments, the sounding board 30 have upstream ends 34, 36 (FIG. 4) that are upstream of the mouthpiece secondary opening 26. This facilitates producing multiple types of game vocalizations without permitting an excessive amount of air to pass through the secondary air member 18 in some situations. In particular, if the user exhales into the call 10 without covering the ends of either the primary air member 16 or the secondary air member 18, air vibrates the reed 28 and passes through the primary air member 16 to imitate a "growl" vocalization. Furthermore, in this case the positions of the reed 28 and the sounding board 30 inhibit an excessive amount of air from passing through the secondary air member 18 which could otherwise prevent the reed 28 from vibrating. In contrast, if the user exhales into the call 10 while covering the end of the primary air member 16, the air passes by the reed 28 without causing the reed 28 to vibrate, and the air then passes through the secondary air member 18. Air passing through the game call 10 in this manner imitates a "snort-wheeze" vocalization.

Furthermore and referring particularly to FIG. 4, the sounding board 30 is preferably disposed between the reed 28 and the mouthpiece secondary opening 26, and the trough passageway 32 preferably faces away from the mouthpiece secondary opening 26. Such a configuration inhibits an excessive amount of air from passing through the secondary air member 18 and further facilitates air movement therethrough as described above.

Referring now to FIGS. 4 and 5, the reed assembly 14 delivers air to the inner air member 15, which is a hollow cylinder-like component. The inner air member 15 includes a first generally cylindrical member 38 that extends into the mouthpiece primary air outlet 24 and is detachably supported by the mouthpiece 12 within the mouthpiece air passageway 22. The first generally cylindrical member 38 includes a wall that defines an inner air member inlet 40 into which the reed assembly 14 extends, and the reed assembly 14 is supported by the first generally cylindrical member 38 within a first inner air passageway 42 in fluid communication with the inlet 40. The first inner air passageway 42 delivers air to a second inner air passageway 44 defined by the wall of a second generally cylindrical member 46. The wall of the second generally cylindrical member 46 also defines a plurality of corrugations 48 that are collapsible and expandable to vary the distance between an inner air member outlet 50 in fluid communication with the second inner air passageway 44 and the first inner air passageway 42. Such variations change the pitch of sounds created by the game call 10.

Referring to FIGS. 4, 5, and 8, the inner air member 15 delivers air to the primary or main air member 16, which is a hollow and tapered component. The primary air member 16 includes a wall that defines a primary air member inlet 52 at an end that extends over and is detachably supported by the mouthpiece 12. The primary air member inlet 52 is in fluid communication with a primary air member passageway 54 that receives air from the inner air member 15. A portion of the wall defining the primary air member passageway 54 preferably conically tapers toward a game call air outlet 56 from which air is capable of exiting the game call 10. Such a construction generally replicates the throat and mouth structure of a deer and creates back pressure within the call 10. This provides relatively mellow and tonally deep sounds that closely imitate, e.g., male deer vocalizations.

Figure 9:
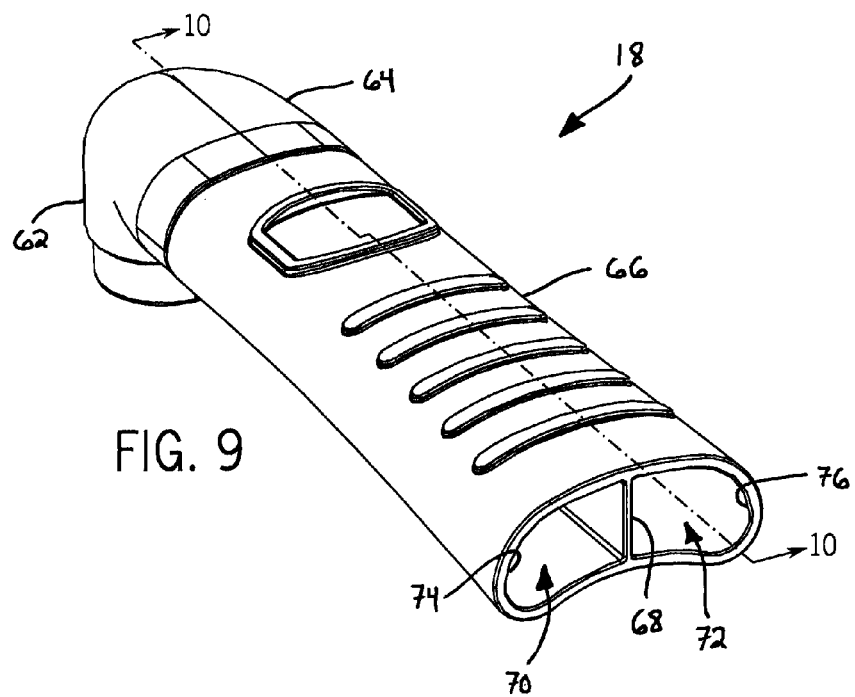
FIG. 9 is a perspective view of a secondary air member of the game call apparatus of FIG. 1.
Figure 10:
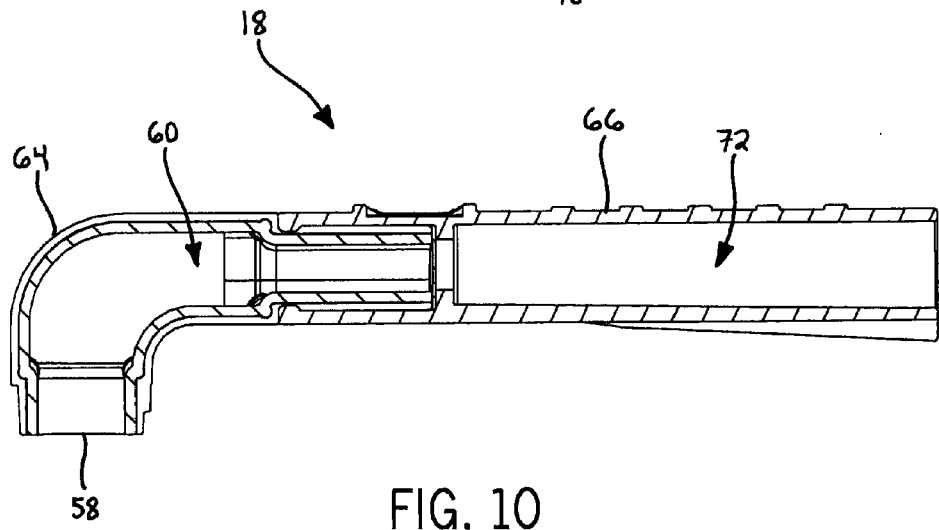
FIG. 10 is a sectional view of the secondary air member along line 10-10 of FIG. 9.

Returning now to the opposite end of the game call 10 and FIGS. 4, 5, 9, and 10, the secondary or auxiliary air member 18 will now be described in further detail. In general, the secondary air member 18 is a hollow horn-like component that includes a wall that defines multiple openings and a passageway for directing air as described above. In particular, the secondary air member 18 includes a secondary opening 58 at an end that extends into the mouthpiece secondary opening 26 and is detachably supported by the mouthpiece 12. The secondary air member 18 also includes a secondary air member passageway 60 in communication with the secondary opening 58. A portion of the wall of the secondary air member 18 includes two elbow channels 62, 64 that together define a sinus cavity-replicating elbow-shaped segment of the secondary air member passageway 60. The elbow-shaped segment preferably abruptly turns 90 degrees to cause a significant pressure reduction for the air moving in the passageway 60.

Adjacent the elbow-shaped segment, the wall includes a detachable horn section 66 that defines an outwardly flared segment of the secondary air member passageway 60. The horn section 66 includes an intermediate wall 68 that splits the secondary air member passageway 60 into two smaller nostril-replicating passageways 70, 72. The passageways 70, 72 are in fluid communication with secondary air member inlet/outlets 74, 76 from which air exits and enters the secondary air member 18 as described above. The secondary air member inlet/outlets 74, 76 preferably face a direction generally parallel to the primary air flow direction. With such a construction, sound created by the game call 10 "aims" in the same direction when producing either a growl or a snort-wheeze.

When using the game call 10, the secondary air member inlet/outlets 74, 76 can be covered to create other types of vocalizations, such as deer "grunts" and "pops".

The game call 10 described above may also be modified in various manners without departing from the spirit of the invention. For example, the specific shape of the secondary air member 18 could take other forms, and the secondary air member inlet/outlets 74, 76 need not face the primary air flow direction. As another example, the secondary air member passageway 60 need not split into the two smaller nostril-replicating passageways 70, 72. As yet another example, various components, such as the inner air member 15, may be omitted or temporarily detached from the remaining components of the game call 10. As yet another example, the primary air member 16 need not taper towards the game call air outlet 56. As yet another example, the one or more components of the game call 10 could be integrally connected instead of being detachable from each other.

From the above description, it should be apparent that the present invention provides a game call that is capable of producing multiple types of game vocalizations, such as a deer growl and a snort-wheeze. It should also be apparent that the game call replicates, with regard to their general shape and positioning, a deer's sound passageways (i.e., throat, sinus cavity, nostrils, and mouth). As such, the sounds created by the game call more closely imitate vocalizations, such as those of male deer, than previous designs. Furthermore, the secondary air member reduces air pressure within the mouthpiece air passageway and inhibits a user from "over-blowing" the call or causing the reed to seize. This permits a user to exhale air into the call at a higher rate compared to previous designs, thereby creating relatively loud imitated vocalizations.

Several embodiments of the invention have been described in considerable detail. As noted above, many modifications and variations to the embodiments described will be apparent to a person of ordinary skill in the art. Therefore, the invention should not be limited to the embodiments described, but should be defined by the claims that follow.

We claim:

1. An apparatus for imitating sounds of game upon receiving air exhaled by a user, the apparatus comprising:
   a mouthpiece including a wall that defines:
      a game call air inlet configured to receive the air exhaled by the user;
      a mouthpiece air passageway in fluid communication with the game call air inlet to receive the air exhaled by the user;
      a mouthpiece primary air outlet in fluid communication with the mouthpiece air passageway to receive at least a portion of the air exhaled by the user;
      a mouthpiece secondary opening in fluid communication with the mouthpiece air passageway and through which air is capable of entering and exiting the mouthpiece air passageway;
   a reed assembly including:
      a sounding board disposed within the mouthpiece air passageway, the sounding board defining a trough passageway through which the at least a portion of the air exhaled by the user passes toward the mouthpiece primary air outlet;
      a reed disposed within the mouthpiece air passageway and configured to vibrate in response to flow of the air exhaled by the user, the reed having an upstream end proximate the game call air inlet;
   a secondary air member including a wall that defines:
      a secondary opening in fluid communication with the mouthpiece secondary opening, an upstream end of the secondary opening proximate the game call air inlet being disposed downstream of the upstream end of the reed;
      a secondary air member passageway in fluid communication with the secondary opening; and
      a secondary air member inlet/outlet in fluid communication with the secondary air member passageway and through which air is capable of entering and exiting the game call.

2. The apparatus of claim 1, wherein the sounding board is disposed between the reed and the secondary opening and the trough passageway faces away from the secondary opening.

3. The apparatus of claim 2, wherein the game call air inlet and the mouthpiece primary air outlet define a primary direction extending therebetween, and the secondary opening faces a secondary direction generally perpendicular to the primary direction.

4. The apparatus of claim 3, wherein the secondary air member inlet/outlet generally faces the primary direction.

5. The apparatus of claim 1, wherein the reed assembly is disposed linearly between the game call air inlet and the mouthpiece primary air outlet.

6. The apparatus of claim 1, further comprising a primary air member including a wall that defines:
   a primary air member passageway in fluid communication with the mouthpiece primary air outlet to receive the at least a portion of the air exhaled by the user; and
   a game call air outlet in fluid communication with the primary air member passageway and from which the at least a portion of the air exhaled by the user exits the game call.

7. The apparatus of claim 6, wherein the game call air inlet and the game call air outlet define a primary direction extending therebetween, and the secondary opening faces a secondary direction generally perpendicular to the primary direction.

8. The apparatus of claim 7, wherein the secondary air member inlet/outlet generally faces the primary direction.

9. The apparatus of claim 1, wherein the trough passageway has a first cross-sectional area, the secondary opening has a second cross-sectional area, and the second cross-sectional area is greater than the first cross-sectional area.

10. The apparatus of claim 9, wherein the game call air inlet and the game call air outlet define a primary direction extending therebetween, and the secondary opening faces a secondary direction generally perpendicular to the primary direction.

11. An apparatus for imitating sounds of game upon receiving air exhaled by a user, the apparatus comprising:
  a mouthpiece including a wall that defines:
    a game call air inlet configured to receive the air exhaled by the user;
    a mouthpiece air passageway in fluid communication with the game call air inlet to receive the air exhaled by the user;
    a mouthpiece main air outlet in fluid communication with the mouthpiece air passageway to receive at least a portion of the air exhaled by the user;
    a mouthpiece auxiliary opening in fluid communication with the mouthpiece air passageway and through which air is capable of entering and exiting the mouthpiece air passageway;
  a reed assembly including:
    a sounding board disposed within the mouthpiece air passageway;
    a reed disposed within the mouthpiece air passageway and configured to vibrate in response to flow of the air exhaled by the user, an upstream end of the reed being disposed upstream of the mouthpiece auxiliary opening and a downstream end of the reed being disposed downstream of the mouthpiece auxiliary opening;
  a main air member including a wall that defines:
    a main air member passageway in fluid communication with the mouthpiece air passageway to receive at least a portion of the air exhaled by the user;
    a game call air outlet in fluid communication with the main air member passageway and from which the at least a portion of the air exhaled by the user exits the game call;
  an auxiliary air member including a wall that defines:
    an auxiliary air member passageway in fluid communication with the mouthpiece auxiliary opening; and
    an auxiliary air member inlet/outlet in fluid communication with the auxiliary air member passageway and through which air is capable of entering and exiting the game call.

12. The apparatus of claim 11, wherein the sounding board defines a trough passageway through which the at least a portion of the air exhaled by the user passes from the mouthpiece air passageway to the main air member passageway, the trough passageway having a first cross-sectional area, the mouthpiece auxiliary opening having a second cross-sectional area, and the second cross-sectional area being greater than the first cross-sectional area.

13. The apparatus of claim 12, wherein the game call air inlet and the game call air outlet define a main direction extending therebetween, and the mouthpiece auxiliary opening faces an auxiliary direction generally perpendicular to the main direction.

14. The apparatus of claim 13, wherein the sounding board is disposed between the reed and the mouthpiece auxiliary opening and the trough passageway faces away from the mouthpiece auxiliary opening.

15. The apparatus of claim 12, wherein the sounding board is disposed between the reed and the mouthpiece auxiliary opening and the trough passageway faces away from the mouthpiece auxiliary opening.

16. The apparatus of claim 15, wherein the game call air inlet and the game call air outlet define a main direction extending therebetween, and the mouthpiece auxiliary opening faces an auxiliary direction generally perpendicular to the main direction.

17. The apparatus of claim 16, wherein the auxiliary air member inlet/outlet generally faces the main direction.

18. The apparatus of claim 11, wherein the reed assembly is disposed linearly between the game call air inlet and the game call air outlet.

19. The apparatus of claim 18, wherein the game call air inlet and the game call air outlet define a main direction extending therebetween, and the mouthpiece auxiliary opening faces an auxiliary direction generally perpendicular to the main direction.

20. The apparatus of claim 19, wherein the auxiliary air member inlet/outlet generally faces the main direction.

\* \* \* \* \*